United States Patent Office 3,003,365
Patented Oct. 10, 1961

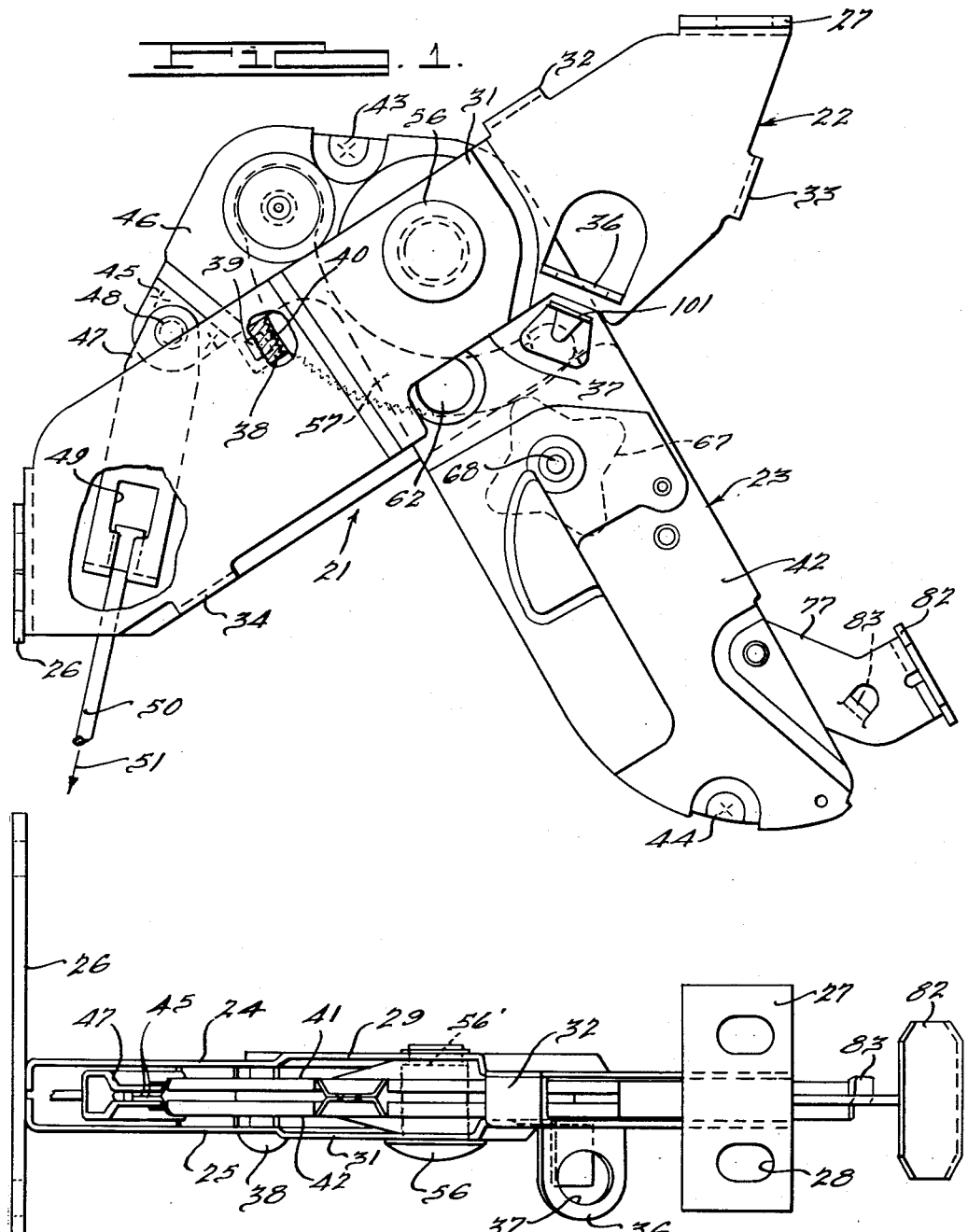

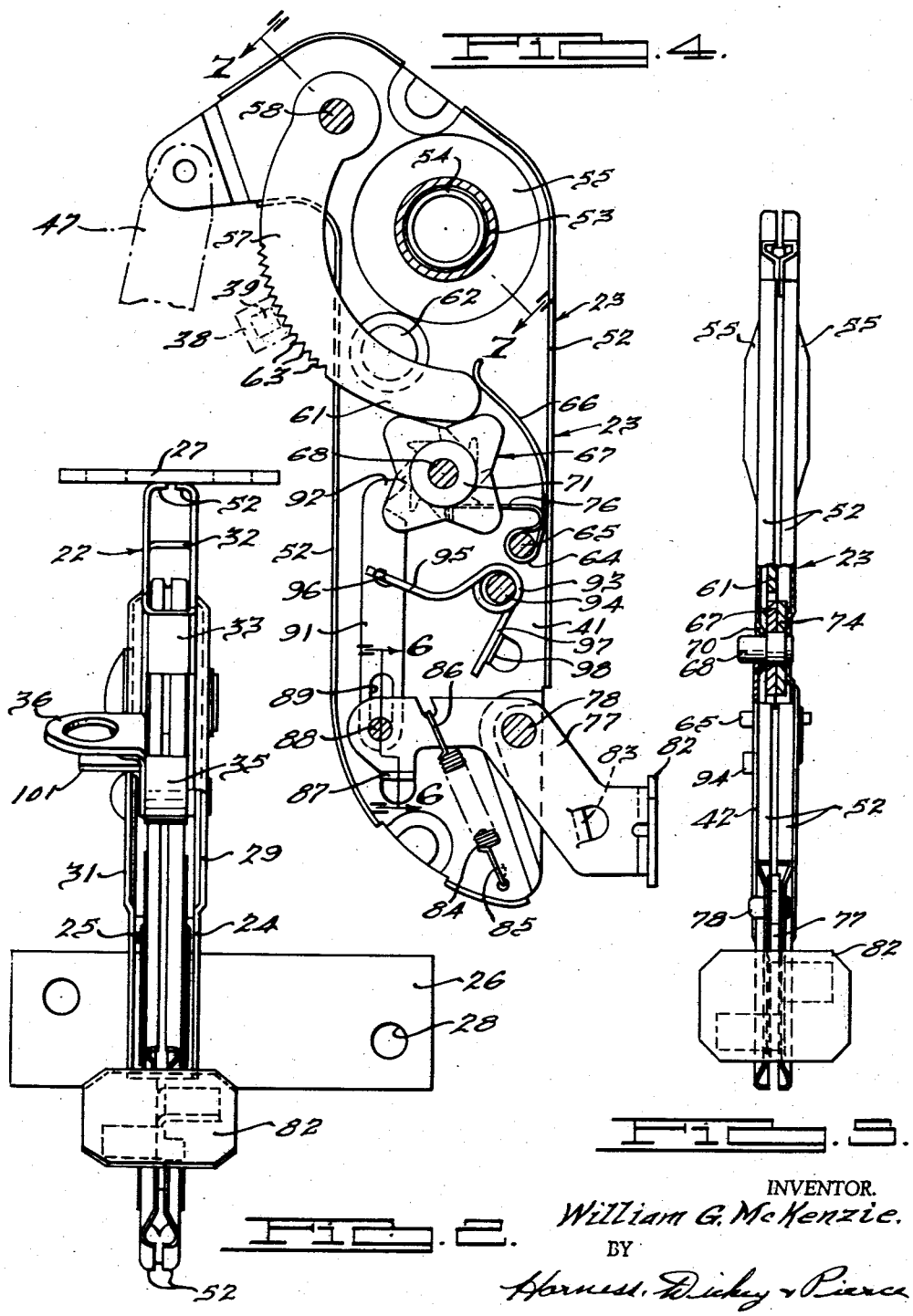

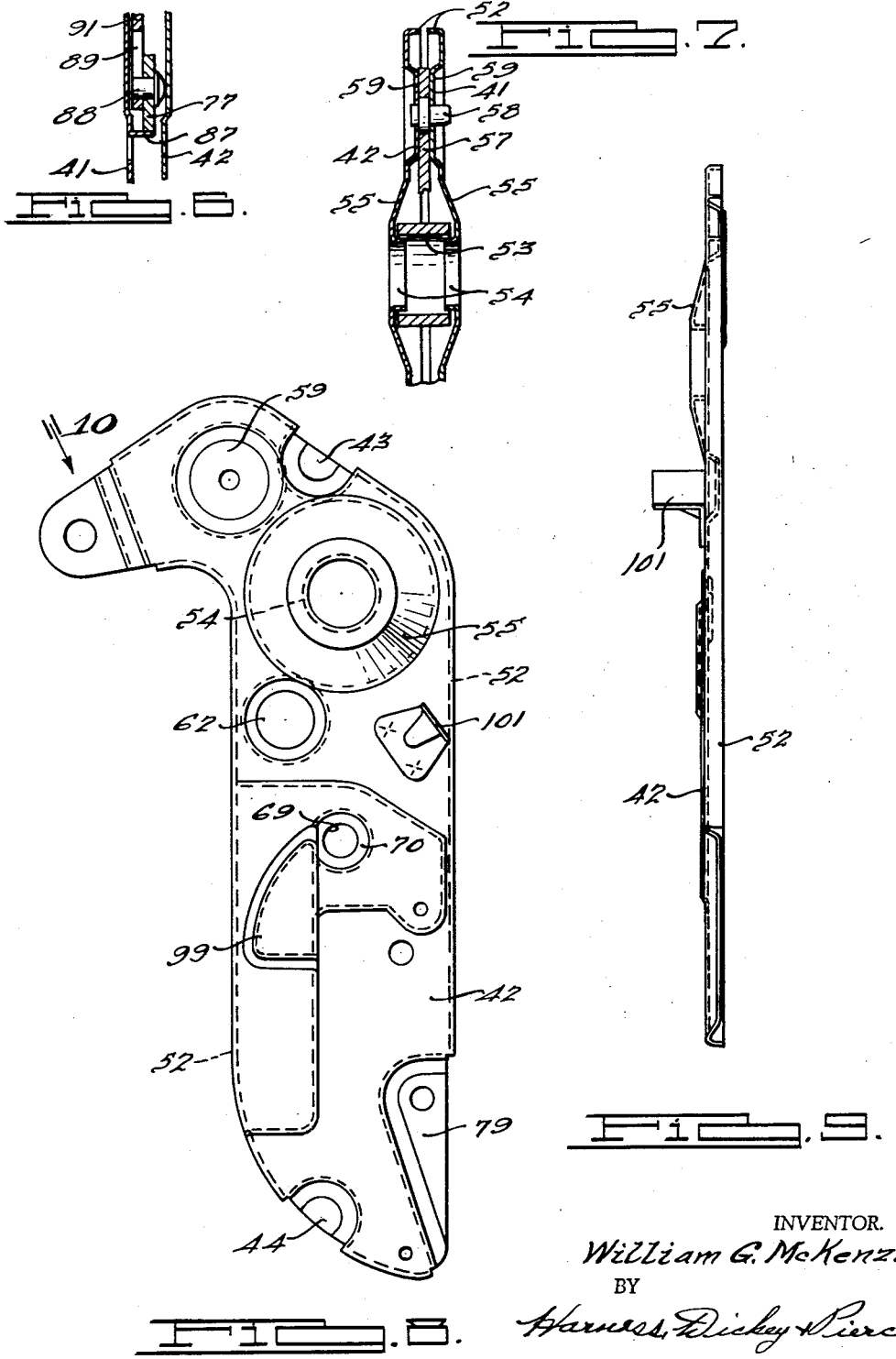

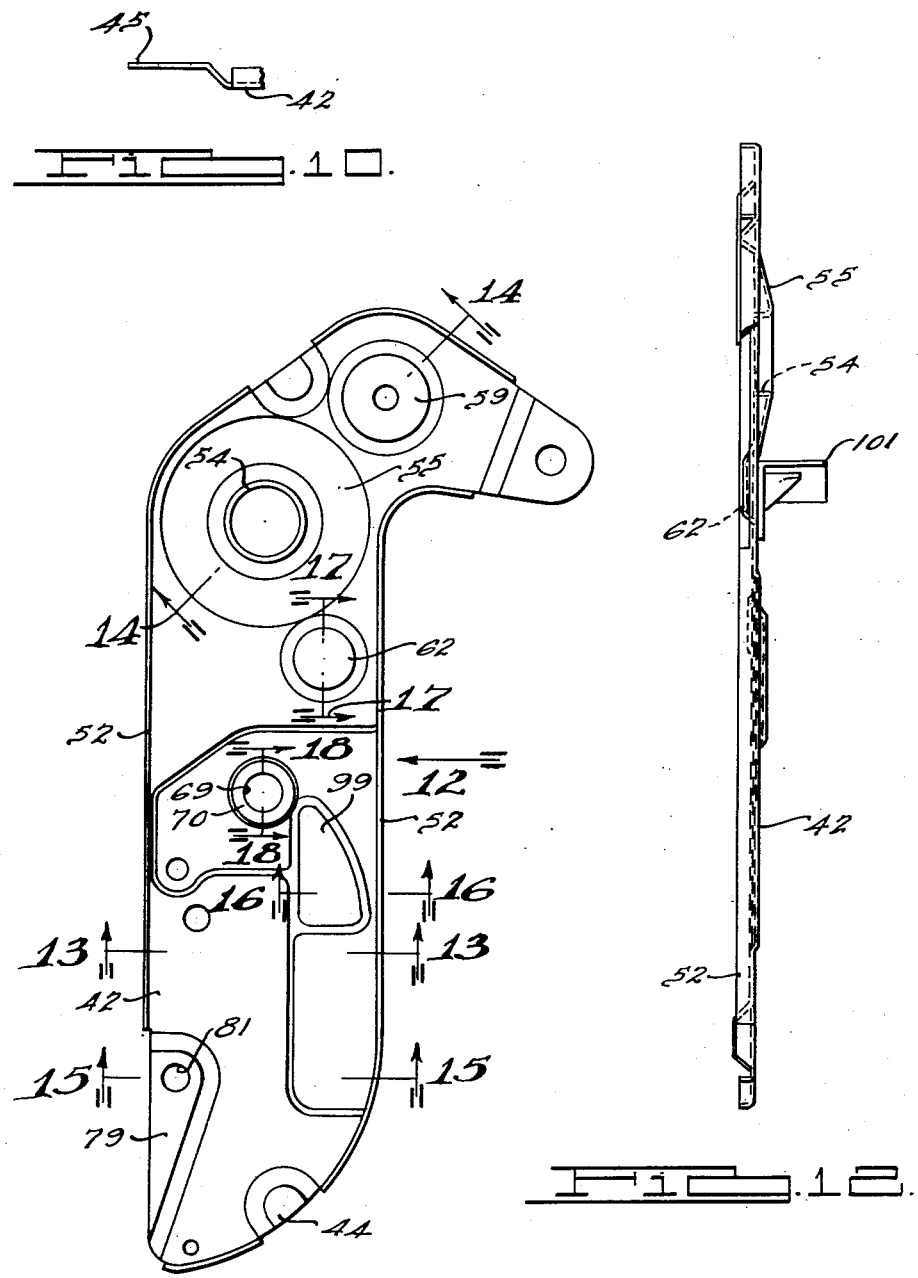

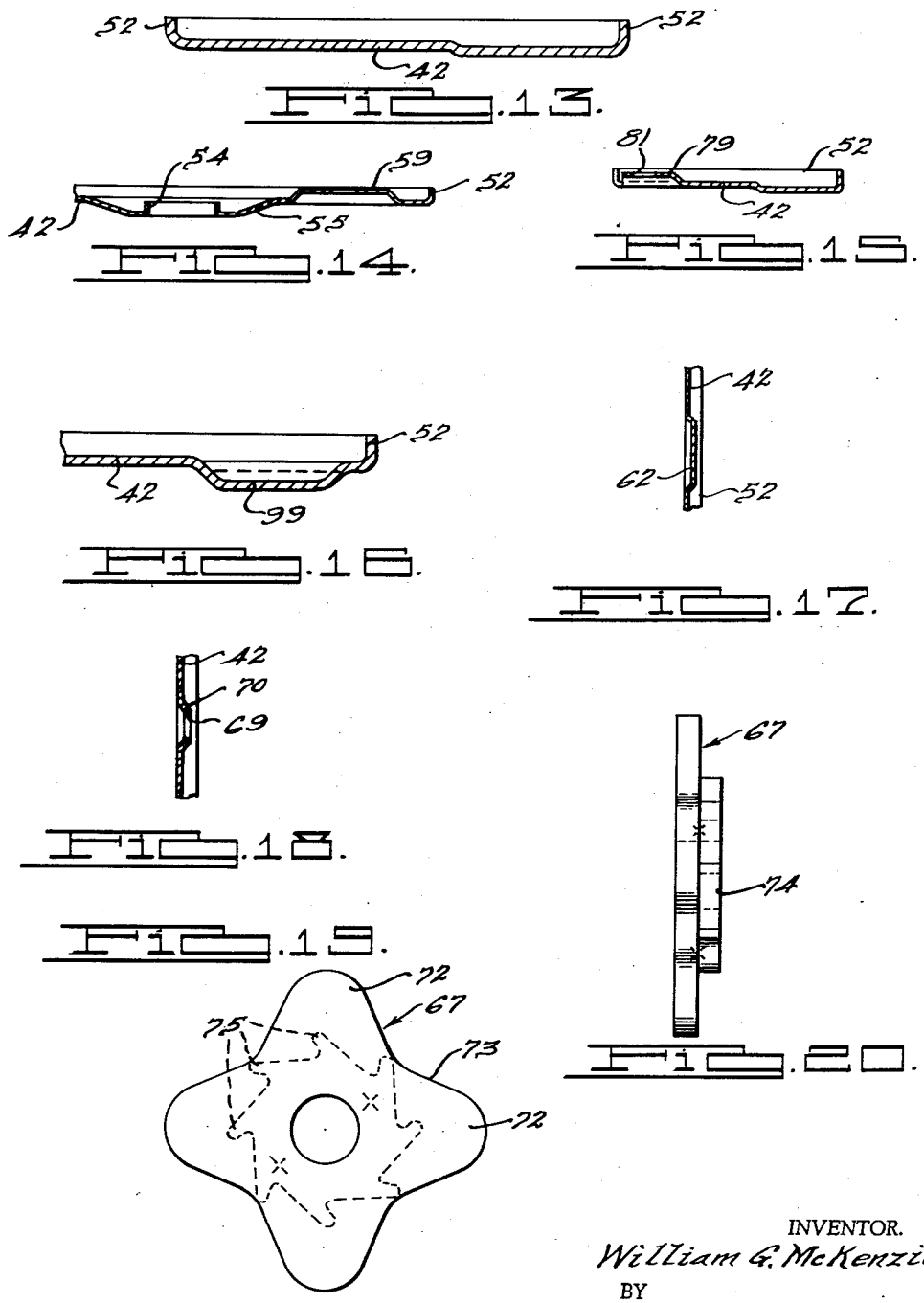

3,003,365
FOOT OPERATED MECHANISM
William G. McKenzie, Racine, Wis., assignor, by mesne assignments, to Walker Manufacturing Company, Racine, Wis., a corporation of Delaware
Filed July 3, 1958, Ser. No. 746,455
14 Claims. (Cl. 74—542)

This invention relates to foot mechanisms, and more particularly to foot-operated parking brakes adapted for use with automotive vehicles.

It is an object of the invention to provide a novel and improved parking brake mechanism which eliminates the need for two or more controls, and in which successive actuations of the same member, such as a foot-operated pedal, will serve to engage and then to release the parking brake.

It is another object to provide an improved parking brake mechanism of this nature which insures full control by the operator of all moving parts during both setting and release of the brake, thus minimizing wear or damage to the parts which might otherwise occur if the latching mechanism would be moved to release position when still under the load imposed by the direct action of the tensioned brake cable.

It is a further object to provide an improved parking brake mechanism of the above character which may be inexpensively fabricated on a production basis with stamped and other low-cost parts, and which may be adapted for various makes and models of automobiles with relatively few parts changes.

Other objects, features and advantages of the present invention will become apparent from the following detailed description taken in conjunction with the accompanying drawings.

In the drawings:

FIGURE 1 is a side elevational view of the novel parking brake actuating mechanism showing the mounting bracket and swingable frame, the mechanism being in brake-released position;

FIGURE 2 is a rear elevational view of the assembly of FIGURE 1, showing the configuration of the mounting bracket;

FIGURE 3 is a top plan view of the assembly;

FIGURE 4 is a side elevational view of the frame with one side plate removed showing the components carried in the frame, the frame being in its braking position;

FIGURE 5 is a rear elevational view of the frame with parts broken away and showing the cam for moving the holding ratchet to its release position;

FIGURE 6 is a fragmentary, cross-sectional view in elevation taken along the line 6—6 of FIGURE 4 and showing the pin-and-slot connection between the foot pedal lever and cam actuator;

FIGURE 7 is a fragmentary, cross-sectional view taken along the line 7—7 of FIGURE 4 and showing the construction of the frame side plates in the vicinity of the holding ratchet pivot;

FIGURE 8 is an elevational view of the left-hand side plate viewed from the outside;

FIGURE 9 is a rear end elevational view of the side plate shown in FIGURE 8;

FIGURE 10 is a fragmentary view taken in the direction of the arrow 10 of FIGURE 8 and showing the offset ear on the frame to which the cable retaining yoke is pivoted;

FIGURE 11 is an inside elevational view of the left-hand frame side plate;

FIGURE 12 is an end elevational view of this side plate taken in the direction of the arrow 12 of FIGURE 11;

FIGURE 13 is a cross-sectional view taken along the line 13—13 of FIGURE 11 and showing the configuration of the side plate in the vicinity of the cam operating pawl;

FIGURE 14 is a fragmentary, cross-sectional view taken along the line 14—14 of FIGURE 11 and showing the side plate construction at the upper portion thereof;

FIGURE 15 is a cross-sectional view taken along the line 15—15 of FIGURE 11 and showing the pivot aperture for the foot pedal lever;

FIGURE 16 is a fragmentary, cross-sectional view taken along the line 16—16 of FIGURE 11 and showing an outwardly formed pawl spring clearance portion in the side plate;

FIGURE 17 is a fragmentary cross-sectional view taken along the line 17—17 of FIGURE 11 and showing one of the inwardly pressed bosses for guiding the holding ratchet;

FIGURE 18 is a fragmentary, cross-sectional view taken along the line 18—18 of FIGURE 11 and showing the pivot aperture for the ratchet actuating cam;

FIGURE 19 is a side elevational view of the ratchet actuating cam and its attached pawl; and FIGURE 20 is an end elevational view of the cam and pawl shown in FIGURE 19.

In general terms, the illustrated embodiment of the novel parking brake mechanism comprises a mounting bracket adapted to be secured under the vehicle dashboard and a frame of flat elongated configuration swingably mounted on this bracket and adapted to be connected to the tensioned cable which operates a parking brake. A foot pedal lever is pivotally mounted on the frame and carries a foot pedal accessible to the operator. The foot pedal lever is so located with respect to the cable connection that depression of the foot pedal will swing the frame in a direction which will cause tensioning of the cable. A holding ratchet is also pivoted on the frame and cooperates with a pawl fixed to the mounting bracket.

Means are provided on the frame for moving the ratchet into operative relation with the pawl in response to a first depression of the foot pedal, and for moving the ratchet out of operative relation with the pawl in response to a second depression of the foot pedal. This means includes a rotatable ratchet actuating cam which is indexed by successive depressions of the foot pedal to alternate positions in which the ratchet is operative or inoperative with respect to the pawl. Thus, upon a first depression of the foot pedal the parking brake cable will be tensioned and the frame will be locked in braking position by engagement of the ratchet with the pawl. The arrangement is such that upon a second depression of the pedal, the torque which the cable exerts on the frame will first be counterbalanced by foot pedal pressure, thus relieving the stress on the ratchet tooth engaged by the pawl. When this occurs, the ratchet will automatically be moved to its inoperative position, and release of foot pedal pressure will then permit the cable tension to be relaxed, releasing the brake and moving the frame to brake-released position.

Referring more particularly to the drawings, the parking brake mechanism is generally indicated at 21 and comprises a mounting bracket generally indicated at 22 and a swingable frame generally indicated at 23 which is rockably mounted on bracket 22 by means to be later described. The mounting bracket is so constructed as to be securable beneath the dashboard of a vehicle or in some other appropriate position accessible to the vehicle operator. In the illustrated embodiment of the invention, bracket 22 comprises a pair of plates 24 and 25 which are in spaced and generally parallel relation as seen in FIGURES 2 and 3. These plates are so shaped as to be disposable in an inclined manner between the rear surface of the fire wall (not shown) and the underside of the dashboard (also not shown) of the vehicle. For this purpose, a fire wall securing clip 26 and a dashboard securing clip 27 are secured to opposite ends of plates 24 and 25, as seen in FIGURES 1, 2 and 3, these clips being provided with appropriate fastener apertures 28.

Intermediate portions 29 and 31 of plates 24 and 25, respectively, are spaced apart a somewhat greater distance than the remaining portions of the plates for the reception and guidance of frame 23, as will be later seen. The edges of the plates may be secured together at spaced portions indicated at 32, 33 and 34. Plate 31 has a pressed-out and apertured tab 36, this tab being adapted to carry a switch (not shown) of the type conventionally used to control a parking brake signal on the dashboard. The adjacent lower edge of plate 31 is recessed as indicated at 37 in order to accomodate a switch-actuating clip on frame 23 to be later described.

A frame holding pawl 38 extends between plates 24 and 25 forwardly of portions 29 and 31 thereof, this pawl taking the form of a block having square ears 39 fitted in corresponding apertures in side plates 24 and 25. Arcuately arranged teeth 40 on pawl 38 are engageable with the holding ratchet as will be later described, and the upper and lower surfaces of the block form stops for the released and braking positions of frame 23, as seen in FIGURE 1.

Frame 23 comprises a pair of side plates 41 and 42 in spaced and generally parallel relation, these side plates being of substantially symmetrical construction. Although some of the constructional details of side plates 41 and 42 will be described later with respect to the mechanism components carried by frame 23, it may be here stated that the side plates are of generally elongated shape and may be fabricated by metal stamping or similar methods. Spaced portions along the edges of side plates 24 and 25 are pressed inwardly and are secured together by spot-welding or similar fastening means. Two of these portions are indicated at 43 and 44 along the upper and lower edges, respectively, of the side plates; a third portion is indicated at 45 and comprises an inwardly pressed tab at the outer end of a transversely extending arm 46 which is formed on each side plate. A cable connecting yoke 47 is pivotally connected at 48 to tabs 45, as seen in FIGURES 1 and 3. Yoke 47 is of generally U-shaped construction and has a slot 49 in one side thereof for the reception of the enlarged end of a brake tension cable 50, seen partially in FIGURE 1. This cable is urged downwardly by the cable tension as shown schematically by arrow 51.

As is seen, for example, in FIGURES 2, 7 and 8, plates 41 and 42 are provided with inturned flanges 52 along the edges thereof for partially enclosing the space formed between the side plates. A tubular spacer 53, best seen in FIGURE 7, is secured between side plates 41 and 42 by inturned annular flanges 54 which form an apertured portion in frame 23, the side plate portions 55 adjacent spacer 53 being outwardly pressed in frustoconical shape. A pivot pin 56, seen in FIGURES 1 and 3, serves to secure frame 23 to bracket 22 between portions 29 and 31 of bracket plates 24 and 25, respectively, the frame being held against lateral movement by the shape of outwardly pressed portions 55. The location of the pivotal axis of frame 23 is adjacent the upper portion of the frame, so that the frame extends downwardly and rearwardly from bracket 22 in the brake-released position of the frame shown in FIGURE 1. Arms 46 of the frame side plates extend forwardly from the upper end of the frame, and it will thus be seen that clockwise swinging of frame 23 from the position shown in FIGURE 1 will result in tensioning of cable 50, which will be drawn upwardly by yoke 47 between plates 24 and 25 of bracket 22.

An arcuate holding ratchet 57 of flat shape is pivotally mounted between the side plates of frame 23 by a pivot pin 58 passing through inwardly pressed portions 59 at the upper end of the frame and forwardly of pivot pin 56, as best seen in FIGURE 7. Ratchet 57 is so curved as to clear the pivotal connection between frame 23 and bracket 22, as seen in FIGURE 4, and the lower end 61 of the ratchet is retained against lateral movement by a pair of inwardly pressed guide portions 62 in side plates 41 and 42, the shape of these guide portions being best seen in FIGURES 8 and 17. The forward edge of ratchet 57 is provided with teeth 63 adapted to engage teeth 40 of pawl 38 when the ratchet is in its holding position as seen in FIGURE 4. The configurations of teeth 40 and 63 are such that the lines of action of these teeth (normal to the contacting surfaces thereof) will be so located as to prevent counterclockwise movement of frame 23 when ratchet 57 engages pawl 38. Ratchet 57 is swingable from its holding position, shown in FIGURE 4, to a retracted position shown in FIGURE 1, teeth 63 of the ratchet being withdrawn from pawl 38 in the retracted position so that frame 23 may swing freely with respect to bracket 22. A leaf spring 64 is secured to a pin 65 carried by frame 23, as seen in FIGURE 4, and one arm 66 of this leaf spring extends upwardly and is engageable with end 61 of ratchet 57 when the ratchet is moved toward its inoperative position, spring arm 66 thus urging the ratchet toward its operative position.

A ratchet actuating cam generally indicated at 67 is rotatably carried by a pivot pin 68 between the side plates of frame 23, this cam being of flat shape and in the same plane as ratchet 57. Pivot pin 68 is disposed within apertures 69 in slightly depressed portions 70 of side plates 41 and 42, as seen in FIGURE 18, these portions being located a little below that portion of frame 23 occupied by outer end 61 of ratchet 57. The construction of cam 67 is best seen in FIGURES 19 and 20, this cam comprising four alternate lobes 72 and recessed portions 73. Secured to one side of cam 67 by spot-welding or similar fastening means is a cam operating ratchet 74, this cam having eight equally spaced teeth 75. An arm 76 is formed on leaf spring 64 and is engageable with teeth 75 of ratchet 74, arm 76 acting as a detent to hold cam 67 in position and prevent counterclockwise rotation thereof as seen in FIGURE 4. When in the position shown in FIGURE 4, a recess 73 of cam 67 will be disposed adjacent outer end 61 of ratchet 57, so that ratchet 57 may move to its holding position as urged by spring arm 66. When cam 67 is rotated from the position shown in FIGURE 4 to the position shown in FIGURE 1, a lobe 72 of the cam will engage ratchet end 61, swinging ratchet 57 counterclockwise to the retracted position shown in FIGURE 1.

The means for actuating frame 23 as well as ratchet 57 comprises a foot pedal lever 77 carried by a pivot pin 78 which is secured to the lower end of frame 23. More particularly, lever 77 is of flat shape and is disposed between depressed portions 79 formed at the lower ends of side plates 41 and 42 as seen in FIGURE 15, apertures 81 being formed in portions 79 for the reception of pin 78. The rearwardly extending portion of arm 77 carries a foot pedal 82 which, when depressed by the car operator, will cause lever 77 to swing in a clockwise direction as seen in FIGURE 4. An outwardly bent stop 83 is formed on lever 77, as best seen in FIGURES 1, 3 and 4, this stop being engageable with the adjacent edge of side plate 41 to determine the clockwise limit of movement of lever 77 about pivot pin 78. A helical tension spring 84 is secured at one end 85 to the lower portion of side plate 41, and at its upper end 86 to lever 77 forwardly of pivot pin 78, thus tending to rotate the lever counterclockwise about its pivot. A stop 87 is bent inwardly from plate 41, this stop being engageable by the underside of lever 77 to limit counterclockwise rotation of the lever, as seen in FIGURE 6. Lever 77 may be of any appropriate length to provide proper leverage for foot operation.

The forward end of lever 77 carries a pin 88 which is disposed within a slot 89 in the lower end of a cam actuator 91 carried by frame 23. This actuator is of elongated shape and is disposed substantially vertically, the upper end of the actuator having a tooth 92 engageable with ratchet 74, and a mouth (dotted lines in FIG. 4) to receive a tooth 75 when the ratchet 74 rotates. A torsion spring 93 is mounted on a pin 94 within frame 23, one arm 95 of this spring being bent through an aperture 96 in actuator 91 and urging the actuator upwardly and to the right as seen in FIGURE 4. The opposite end 97 of spring 93 engages an offset tab 98 formed on plate 41. As seen in FIGURE 16, outwardly pressed portions 99 are formed on side plates 41 and 42 in the vicinity of the connection between spring arm 95 and ratchet 91 for clearance purposes. Spring 84 is stronger than spring 93, so that pin 88 will normally engage the bottom of slot 89 and prevent spring 93 from moving actuator 91 upwardly. However, when pin 88 is moved upwardly in slot 89 by clockwise movement of foot pedal lever 77, spring 93 will be permitted to move actuator 91 upwardly, overcoming the effect of leaf spring 64, and thus indexing cam 67 forty-five degrees. It should be noted that the travel of stop 83 from its position as shown in FIGURE 4 to its engagement with the edge of side plate 41 is such that pin 88 will not engage the upper end of slot 89. Thus, the force applied to foot pedal 82 will not be transmitted to ratchet 74, but will be applied to frame 23.

A switch actuating clip 101 is secured by spot welding or similar means to the outer surface of side plate 42, as seen in FIGURES 1 and 8. This clip is located as to move toward the underside of switch mounting tab 36 when frame 23 swings counterclockwise to its brake-release position. In this manner, clip 101 may be caused to engage the plunger of a switch (not shown) which controls a dashboard brake signal.

In operation, let us assume an initial condition in which the parking brake is released. Under this condition, frame 23 will be in its counterclockwise or released position as shown in FIGURE 1. Ratchet 57 and cam 67 will likewise be in their released position as shown in this figure. If it is desired to apply the parking brake, the operator will apply pressure to foot pedal 82. If the resistance of brake cable 50 is less than that of spring 84, the frame 23 will immediately swing clockwise about pivot 56. As force 51 increases, additional foot pressure will expand spring 84 and permit pedal 82 to rotate about pin 78 until ear 83 engages the face of the frame so that additional foot pressure continues to draw cable 50 upwardly.

As lever 77 swings clockwise about pivot 78, pin 88 will move upwardly within slot 89, thus permitting spring 93 to move actuator 91 upwardly, indexing cam 67 forty-five degrees. This will cause cam 67 to assume the position shown in FIGURE 4, permitting spring arm 66 to move ratchet 57 clockwise to the position shown in this figure. Teeth 63 of ratchet 57 will thus engage pawl 38, teeth 63 riding past the pawl as the operator continues to tension cable 50. It should be noted that ratchet 57 will not be held against pawl 38 with excessive force, so that there will be relatively little wear on teeth 63 or on pawl 38.

When cable 50 has been sufficiently tensioned to apply the brake, the operator will release his pressure from foot pedal 82. This will permit spring 84 to move foot pedal level 77 counterclockwise to the position shown in FIGURE 4, and as pin 88 engages the bottom of slot 89 during this counterclockwise movement, actuator 91 will be drawn downwardly until it engages the next tooth 75 on ratchet 74.

The release of foot pedal 82 by the operator will also remove the torque applied to frame 23 through stop 83 of foot pedal lever 77. The tensioned cable 50 will thus urge frame 23 counterclockwise, but engagement of pawl 38 with ratchet 57 will prevent such counterclockwise movement, thus holding frame 23 in its braking position as shown in FIGURE 4. It should be noted that with the parts in their braking position, the force transmitted by cable 50 to frame 23 will be transmitted directly through ratchet 57 and pawl 38 to mounting bracket 22, so that no stress will be imposed on the other portions of the mechanism by this force.

When it is desired to release the parking brake, the operator will again depress foot pedal 82. As foot pedal lever 77 moves clockwise from the position shown in FIGURE 4, pin 88 will leave the bottom of slot 89, and spring 93 will urge actuator 91 upwardly. However, because of the force exerted between ratchet 57 and pawl 38, the ratchet will be held against movement by cam 67, so that actuator 91 will be momentarily ineffective to rotate the cam.

When stop 83 of lever 77 engages frame 23, further pressure applied by the operator will cause a torque to be applied to frame 23 counteracting the torque applied to the frame by tensioned cable 50. As these torques approach a balanced condition, the force between ratchet 57 and pawl 38 will be decreased sufficiently to enable ratchet 57 to be moved to its retracted position by cam 67, the cam being rotated by upwardly movement of actuator 91 as urged by spring 93. This movement will be accompanied by an audible click as a tooth 75 of pawl 74 passes spring arm 76, and as the operator then releases pressure from foot pedal 82, cable 50 will swing frame 23 counterclockwise as it moves downwardly, until the frame engages pawl 38. Foot pedal lever 77 will simultaneously rock counterclockwise about pivot 78, drawing actuator 91 downwardly.

It should be observed that the withdrawal of ratchet 57 from pawl 38 will be accomplished when there is only a pre-determined maximum spring force exerted between these parts since the operator's foot must take most of the brake cable load 51 off the parts before the ratchet will release. Thus, the wear on the ratchet and pawl will be relatively slight, increasing the reliability of the mechanism over long periods of use.

In addition to the novel functioning and mode of operation, the parking brake mechanism disclosed herein has numerous features that are of importance in the low cost, mass manufacture for automotive type usage. It is to be noted, for example, that the inexpensively formed stamped parts are shaped in unique ways to provide additional strength as well as to furnish support for parts, including moving parts, connected to them or contained within them. The various transverse pins are provided with outwardly facing shoulders that engage inside faces of the stampings so as to maintain a minimum spacing of opposite halves of the stamping and prevent binding due to inadvertent distortion of the bracket or frame. The shoulder 56' in FIGURE 3 illustrates this principle which will also be observed in other pins shown in the drawing. Of special significance is the arrangement whereby the frame 23 can be a standard part that will suit various makes and models of automobiles or trucks, the bracket 22 constituting the variable part that will be designed to suit each make or model of automobile on which the mechanism is to be used. Bracket 22, for example, could consist of a single plate rather than two plates in some installations. In its released position, it should be noted that all movable parts of the mechanism will be spring-loaded, thus minimizing noise or rattling. In general, the arrangement is compact and makes efficient use of parts, pawl 38 for example being used additionally as a stop for frame 23 in its released or full braking position.

While it will be apparent that the embodiment of the invention herein disclosed is well calculated to fulfill the objects of the invention, it will be appreciated that the invention is susceptible to modification, variations and change without departing from the proper scope or fair meaning of the subjoined claims.

What is claimed is:

1. In a mechanism for actuating a parking brake or the like, a first member adapted to be secured in fixed position, a second member mounted on said first member and adapted to be moved between a released position and a braking position, means for securing a brake actuating cable or the like to said second member, holding means between said members actuatable between engaged and disengaged positions, said holding means when in its engaged position preventing movement of said second member from its braking position to its released position, an operator-controlled member movably mounted on said second member, said operator-controlled member being of sufficient size to transmit a brake setting force and being movable between a retracted position and a transmitting position in which force applied thereto by an operator will be transmitted to said second member in a direction urging said second member toward its braking position, and means responsive to the completion of movement of said operator-controlled member to its transmitting position and its subsequent application of force to said second member sufficient to counter the cable force for moving said holding means to its disengaged position.

2. In a mechanism for actuating a parking brake or the like, a first member adapted to be secured in fixed position, a second member mounted on said first member and adapted to be moved between a released position and a braking position, means for securing a brake actuating cable or the like to said second member, holding means between said members actuatable between engaged and disengaged positions, said holding means when in its engaged position preventing movement of said second member from its braking position to its released position, an operator-controlled member movably mounted on said second member, said operator-controlled member being of sufficient size to transmit a brake setting force and being movable between a retracted position and a transmitting position in which force applied thereto by an operator will be transmitted to said second member in a direction urging said second member toward its braking position, and means responsive to a first movement of said operator-controlled member to its transmitting position for moving said holding means into engaged position and responsive to a second movement of said operator-controlled member to its transmitting position and its application of force to said second member in a braking direction sufficient to counter the cable force for moving said holding means to its disengaged position.

3. In a mechanism for operating a parking brake of the type having a tensioned cable, a fixed member, a brake actuating member mounted on said fixed member, means for connecting a tensioned cable to said brake actuating member whereby the cable urges said brake actuating member toward a released position, a foot pedal member movably mounted on said brake actuating member and movable by foot operation from a retracted position to a transmitting position in which foot pressure is transmitted to said brake actuating member to urge the brake actuating member toward a braking position, holding means between said fixed member and said brake actuating member, said holding means being movable between a disengaged position and an engaged position preventing movement of said brake actuating member from its braking position to its released position, and means responsive only to movement of said foot pedal member to its transmitting position and subsequent application of foot pressure to said brake actuating member substantially counteracting said cable tension to move said holding means to its disengaged position.

4. In a mechanism for operating a parking brake or the like, a fixed member, a movable member comprising a pair of elongated sheet metal elements secured together to form a hollow frame, said frame being pivoted to said fixed member, means for securing a tensioned cable or the like to one end of said frame, the frame being movable between a released position and a braking position actuating said cable, holding means between said fixed member and frame, said holding means being movable between engaged and disengaged positions, the holding means when in its engaged position preventing movement of said frame from its braking position to its released position, an operator-controlled member mounted on said frame of a size sufficient to transmit a brake setting force and movable from a retracted position to a transmitting position in which operator pressure will be transmitted to the frame urging the frame toward its braking position, and means within said frame responsive to the completion of movement of said operator-controlled member to its transmitting position and its subsequent application of force to said frame sufficient to counter the cable force to move said holding means to its disengaged position.

5. In a mechanism for operating a parking brake of the type having a tensioned cable, a fixed member, a frame swingably mounted on said fixed member and movable between a released position and a braking position, means for securing a tensioned cable to said frame whereby the cable urges said frame toward its released position, a foot pedal lever pivoted on said frame, means urging said foot lever toward a retracted position, the lever being movable by foot pressure to a transmitting position in which further application of foot pressure is transmitted to said frame so as to urge the frame toward its braking position, holding means comprising pawl and ratchet elements between said fixed member and frame, one of said elements being movable between a disengaged position and an engaged position preventing movement of said frame from its braking to its released position, means responsive to a first movement of said foot pedal lever to its transmitting position for moving said one element to its engaged position, and means responsive to a second movement of said foot pedal lever to its transmitting position and application of foot pressure upon said foot pedal lever sufficient to counter the cable force for moving said one element to its disengaged position.

6. In a mechanism for operating a parking brake of the type having a tensioned cable, a fixed member, a frame swingably mounted on said fixed member and movable between a released position and a braking position, means for securing a tensioned cable to said frame whereby the cable can urge said frame toward its released position, a foot pedal lever pivoted on said frame, means urging said lever toward a retracted position, the lever being movable by foot pressure to a transmitting position in which further application of foot pressure can be transmitted to said frame so as to urge the frame toward its braking position, holding means comprising pawl and ratchet elements between said fixed member and frame, one of said elements being movable between a disengaged position and an engaged position preventing movement of said frame from its braking to its released position, a cam rotatably mounted on said frame independently of said foot pedal lever and engageable with said movable holding means element, said cam having alternate portions adapted to cause movement of said movable holding means element between its engaged and disengaged positions, and means responsive to successive movements of said foot pedal lever to its transmitting position and application of force on said foot pedal lever sufficient to counter the cable force for indexing said cam to bring said alternate portions into engagement with said movable holding means element.

7. The combination according to claim 6, said last-mentioned means comprising a ratchet secured to said cam, a cam actuator engageable with said last-mentioned ratchet, a spring urging said cam actuator in a direction tending to rotate said cam and ratchet, and a pin-and-slot connection between said foot pedal lever and cam actuator, the position of said last-mentioned connection being such that said cam actuator is restrained when said foot pedal lever is in its retracted position and may be advanced by said spring when the foot pedal lever is moved toward its transmitting position.

8. In a mechanism for operating a parking brake of the type having a tensioned cable, a fixed member, an elongated frame swingably mounted on said member, means at one end of said frame for securing a tensioned cable thereto whereby the cable will urge said frame toward a released position, means on said fixed member limiting the released position of said frame, an operator-controlled lever movably mounted at the opposite end of said frame, said lever being of sufficient size to transmit a brake setting force and being movable between a retracted position and a transmitting position in which pressure applied thereto by an operator urges said frame toward its braking position, a pawl secured to said fixed member, a ratchet swingably mounted on said frame and movable between a retracted position and a holding position with respect to said pawl, the pawl preventing movement of said frame to its released position when said ratchet is in its holding position, and means for moving said ratchet to its retracted position in response to the completion of movement of said operator-controlled lever to its transmitting position and the application of operator pressure by its sufficient to counter the cable force and to substantially reduce the force acting between said pawl and ratchet.

9. The combination according to claim 8, said fixed member comprising a bracket having a pair of plates in spaced substantially parallel relation, said frame being disposed between said plates, said pawl comprising a member fixed to said plates and extending therebetween, and means on said plates for securing the fixed member to a vehicle or the like.

10. The combination according to claim 9, said frame comprising a pair of substantially symmetrical shell-like plates, means at spaced portions of said plates for securing the plates in mating relation, said fixed member comprising a pair of plates in spaced generally parallel relation, said frame being disposed between intermediate portions of said last-mentioned plates, and means at opposite ends of said fixed member for securing the fixed member to a vehicle or the like.

11. In a mechanism for operating a parking brake of the type having a tensioned cable, a fixed bracket, an elongated frame swingably mounted on said bracket, means at the upper end of said frame for connecting a tensioned cable thereto whereby the cable urges said frame toward a released position, a foot pedal lever pivoted at the lower end of said frame and having a foot pedal at the rear portion thereof, a spring urging said lever toward a retracted position, a stop on said frame limiting the retracted position of said lever, a stop on said lever engageable with said frame when the lever is moved from its retracted position to define a transmitting position of said lever, whereby further pressure on said pedal causes torque to be applied to said frame counteracting said cable tension, a ratchet pivoted at the upper end of said frame, a pawl on said fixed member, a spring urging said ratchet against said pawl, a cam rotatably mounted on an intermediate portion of said frame and having alternate lobes and depressions engageable with said ratchet whereby the ratchet may be alternately moved to engaged and disengaged positions when the cam is indexed, a ratchet fixed to said cam, a cam actuator engageable with said last-mentioned ratchet, a spring urging said cam actuator in a direction to index said cam, and a pin-and-slot connection between said foot pedal lever and cam actuator, the position of said pin-and-slot connection being such that said cam actuator is restrained when said foot pedal lever is in its retracted position, said foot pedal lever spring being of greater strength than said cam actuator spring whereby the cam actuator is held in retracted position.

12. The combination according to claim 11, said first-mentioned ratchet being of arcuate shape with the curvature thereof generally concentric with the pivot axis of said frame.

13. The combination according to claim 11, said pawl having a portion engaged by said frame to define the released position of the frame.

14. The combination according to claim 11, further provided with a detent spring engageable with said cam ratchet to prevent retrograde movement thereof, said detent spring being capable of producing an audible click when said cam is indexed.

References Cited in the file of this patent

UNITED STATES PATENTS

| | | |
|---|---|---|
| 738,100 | Cuntz | Sept. 1, 1903 |
| 747,672 | Babcock | Dec. 22, 1903 |
| 1,495,592 | Holland | May 27, 1924 |
| 1,823,695 | Moorhouse | Sept. 15, 1931 |
| 2,128,298 | Jandus | Aug. 30, 1938 |
| 2,141,266 | Dickerson | Dec. 27, 1938 |
| 2,159,821 | Sandberg et al. | May 23, 1939 |
| 2,281,467 | Thorp | Apr. 28, 1942 |
| 2,308,898 | Skareen | Jan. 19, 1943 |
| 2,694,945 | Jandus | Nov. 23, 1954 |
| 2,784,770 | Herr | Mar. 12, 1957 |
| 2,851,900 | Powell | Sept. 16, 1958 |
| 2,908,185 | Koskela | Oct. 13, 1959 |
| 2,940,334 | Koskela | June 14, 1960 |

FOREIGN PATENTS

| | | |
|---|---|---|
| 84,075 | Germany | Nov. 23, 1895 |

UNITED STATES PATENT OFFICE
CERTIFICATION OF CORRECTION

Patent No. 3,003,365                            October 10, 1961

William G. McKenzie

It is hereby certified that error appears in the above numbered patent requiring correction and that the said Letters Patent should read as corrected below.

Column 5, line 64, for "level" read -- lever --; column 6, line 22, for "upwardly" read -- upward --; column 8, line 21, strike out "foot"; column 9, line 20, before "application" insert -- subsequent --; line 21, for "its" read -- it --; line 31, for the claim reference numeral "9" read -- 8 --.

Signed and sealed this 24th day of April 1962.

(SEAL)
Attest:

ESTON G. JOHNSON
Attesting Officer

DAVID L. LADD
Commissioner of Patents